Oct. 8, 1963        J. H. SMALLRIDGE ET AL        3,106,596
            METHOD FOR REPAIRING SELF-BAKING ELECTRODES
Filed Nov. 10, 1961                             2 Sheets-Sheet 1

INVENTORS
JAMES H. SMALLRIDGE
SETH C. WILLARD
BY Frederick J. McCarthy
ATTORNEY

Oct. 8, 1963  J. H. SMALLRIDGE ET AL  3,106,596
METHOD FOR REPAIRING SELF-BAKING ELECTRODES
Filed Nov. 10, 1961  2 Sheets-Sheet 2

INVENTORS
JAMES H. SMALLRIDGE
SETH C. WILLARD
BY Frederick J. McCarthy Jr.
ATTORNEY

United States Patent Office 3,106,596
Patented Oct. 8, 1963

3,106,596
METHOD FOR REPAIRING SELF-BAKING ELECTRODES
James H. Smallridge, Greenwich, Conn., and Seth C. Willard, Ashtabula, Ohio, assignors to Union Carbide Corporation, a corporation of New York
Filed Nov. 10, 1961, Ser. No. 151,478
4 Claims. (Cl. 13—18)

The present invention relates to electric furnace processes which employ self-baking electrodes. More particularly, the present invention relates to a method for minimizing delays in electric furnace processes which occur due to breakage of self-baking electrodes during operation.

Self-baking electrodes of the type disclosed in United States Patent 1,440,724 to Söderberg are employed in various operations in the electric furnace industry. It is a characteristic of these electrodes, commonly called "Söderberg" electrodes, that only the baked lower end portion is electrically conductive to any appreciable extent with the upper portion of the self-baking electrode comprising a metal-sheathed highly viscous, plastic mixture of carbonaceous matter with a binder such as pitch or tar. Under operating conditions, electrically conductive clamps are arranged in contact with the metal sheath for the purpose of supplying electrical energy to the electrode. The metal sheath serves as the main conductor of electric current in the electrode column above the fully-baked portion of the electrode, which portion extends downward from just below or slightly within the contact clamps.

As the lowermost portion of the electrode is gradually consumed in the electric furnace, the electrode column is progressively lowered into the furnace through the clamps, additional mix being added at the top of the electrode column for the purpose of maintaining continuous furnace operation. As a result of lowering the electrode through the clamps, additional unbaked mix material is exposed to the heat developed in the furnace and in the sheath. This mix material is consequently baked and becomes bonded to and integral with the already baked lower portion of the electrode. In order to achieve continuous furnace operation, it is necessary that an effective bond exist throughout the baked portion of the electrode. Since the materials in the electrode mix, coal, pitch and the like, are natural unrefined substances and therefore variable in characteristics, satisfactory bonding is not always achieved. As a consequence, when a poorly bonded zone is present below the electrode clamps, a break sometimes occurs, resulting in a so-called stub, and it becomes necessary to shut-down the furnace. Under these circumstances, the presently known practice is to break up the stub, by blasting or other means, so that it can be removed from the furnace. After removal of the stub, a steel plate is welded over the lower end of the electrode column to prevent, if possible, loss of the plastic mix above the break. The conventional procedure for starting a new electrode is then followed in order to produce a sufficiently extended new baked portion below the electrode clamps which can be satisfactorily employed in the furnace. This entire operation, i.e. removal of the stub and generation of a new baked portion, generally requires between six and eight days, depending on the size, i.e. diameter, of the electrode, and accordingly a severe economic penalty is placed upon the furnace operation.

It is therefore an object of the present invention to provide a method for restoring an electric furnace to full operation with a minimum of delay after the occurrence of a stub-forming break in a self-baking electrode employed in the furnace.

Other objects will be apparent from the following description and claims taken in conjunction with the drawing in which:

In accordance with the present invention, a method for repairing a self-baking electrode which has experienced a stub-forming break in an electric furnace comprises bringing the mating surfaces of the severed portions of the electrode into forcible contact; and supplying between about ¼ and ⅓ normal operating power to the electrode until additional electrode material is baked which is sufficient to permit normal furnace operation to be resumed.

Figure 1:
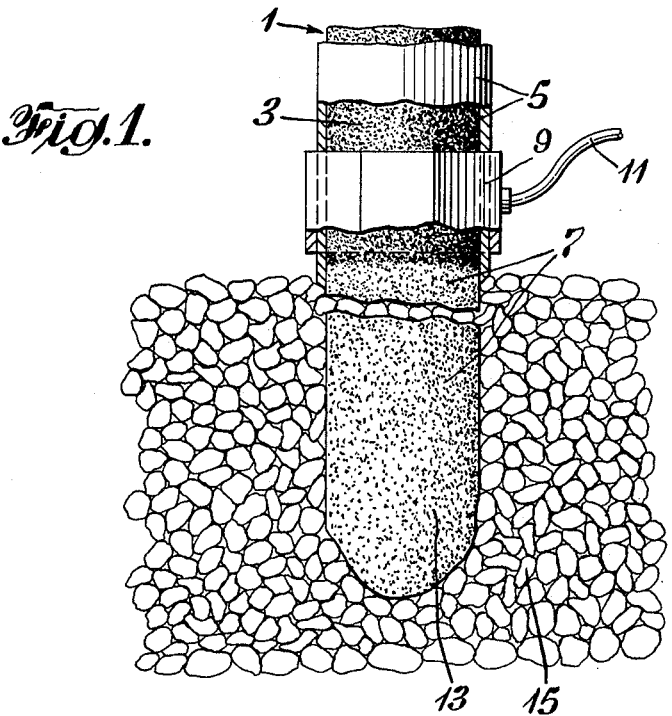
FIGURE 1 shows, somewhat schematically, an elevation view of a self-baking electrode which has experienced a stub-forming break.

With reference to the drawing, FIGURE 1 shows a self-baking electrode 1 having an upper unbaked section 3, enclosed by a metal sheath 5, and a lower baked section 7. Electrically conductive clamps 9 are arranged to contact sheath 5 and conductor 11 is provided to supply electrical energy to the electrode from a suitable source (not shown). A portion of the baked section of the electrode, stub 13, has broken away from the electrode column and settled slightly into the surrounding furnace charge 15 requiring shut-down of the furnace operation.

Figure 2:
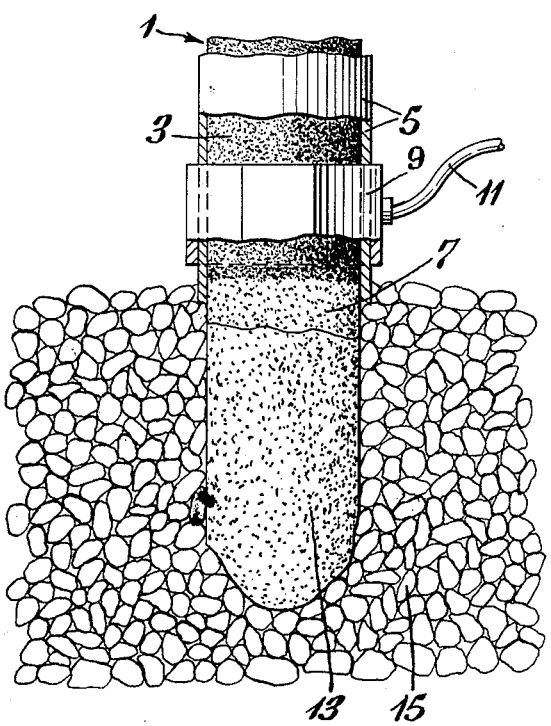
FIGURE 2 shows the electrode column of FIGURE 1 lowered in position to establish a forcible mating contact with the stub.

In accordance with the present invention, and as illustrated in FIGURE 2, the upper column of the electrode is lowered and thereby brought into close mating contact with stub 13, the stub being arranged in axial alignment with the electrode column. When the mating surfaces of the stub and electrode column are aligned and in contact, a forcible contact is provided by causing a portion of the weight of the electrode column to be supported by the stub.

Under most circumstances, when repairing a 42 inch diameter electrode, a force of about 2 to about 6 pounds per in.$^2$ between the electrode column and stub is sufficient.

After forcible contact is established, electrical energy is once again supplied to the electrode through clamps 9. However, the value of the power input is restricted to between about ¼ and ⅓ normal operating value. The amount of heat developed in the furnace by the reduced power input will result in satisfactory continued baking of the plastic mix while at the same time causing the lowermost portion of the electrode to be gradually consumed in the furnace. A higher power input, on the other hand, will tend to disrupt the forcible supporting contact between the electrode column and stub and also prevent consumption of the stub as a result of the increased amount of heat and evolution of gas at the relatively high electrical resistance contact between the stub and electrode column. Lower values of power input have not been found sufficient to provide satisfactory baking of additional mix to compensate for consumption of the electrode.

Normal operating power values for electric furnace operations vary depending on the diameter of the particular electrode and to some extent on the particular mix employed. In general, however, normal operating power ranges between 12 megawatts and 25 megawatts for electrodes having diameters between 42 and 50 inches. Accordingly, the reduced power input values employed in the method of the present invention will most often range between about 3 mw. and 8 mw.

In the practice of the present invention, the reduced electrode power, i.e. between ¼ and ⅓ normal value, is applied continuously, except for short interruptions about every three or four hours to permit safe observation of the contact between the electrode column and stub. As previously mentioned, the lowermost portion of the stub is gradually consumed in the practice of the present invention and accordingly the electrode column is lowered, i.e. slipped to the same extent. As a result of the slipping, additional electrode mix is exposed to high temperatures and is consequently baked and bonded to the existing baked portion of the electrode.

During the period when the electrode power input is between ¼ and ⅓ normal, the electrode is preferably operated in a carbon deficient furnace so that the contact between the electrode column and stub can be conveniently inspected. In the case of a calcium carbide furnace, the surrounding charge during this period would be predominantly lime.

Under most circumstances, with self-baking electrodes of the type usually employed, the baking of a new portion of electrode mix sufficient to permit normal furnace operation will be completed in about 40 to 48 hours. Most often the electrode stub will have been substantially consumed in the same amount of time. If the stub has not been completely consumed by this time, the application of increased power to the electrode will accomplish this result in a very short period. In comparison with the 40 to 48 hours required in the present invention, when using previously known techniques for the same purpose, between six and eight days were required before normal furunace operation could be resumed.

It sometimes happens that a close fitting of the stub and electrode column cannot be achieved over a major portion of the joint. Under these circumstances, there is a very substantial electrical resistance at the contacting surfaces and the consequent $I^2R$ generation of heat is considerable and causes excessive evolution of gas from the mix binder which tends to disrupt the supporting contact between the stub and electrode column and also reduces consumption of the stub. In order to reduce the excessive and undesirable generation of heat within the joint, an electrically conductive path is provided between the adjacent peripheral surfaces of the column and stub and shunting the joint. In this manner, the amount of heat at the vicinity of the joint is tolerable while the current in the lower baked portion of the electrode is sufficient to provide the heat necessary for satisfactory baking of additional mix as the electrode is slipped, and for consumption of the stub. In a preferred embodiment, the shunting electrically conductive path is in the form of a metal clamp of the type illustrated in FIGURE 3. The clamp of FIGURE 3 is suitably formed of steel plate and is seen to be constructed in two sections, 17 and 19, although more than two sections can be employed when desired.

When assembled, the clamp is cylindrical in form having a diameter corresponding to that of the electrode to be repaired. The clamp must be long enough to enclose the joint and provide an effective contact between the electrode column and stub. It is also of advantage to make the clamp sufficiently long to assist in mechanically strengthening the joint.

Figure 3:
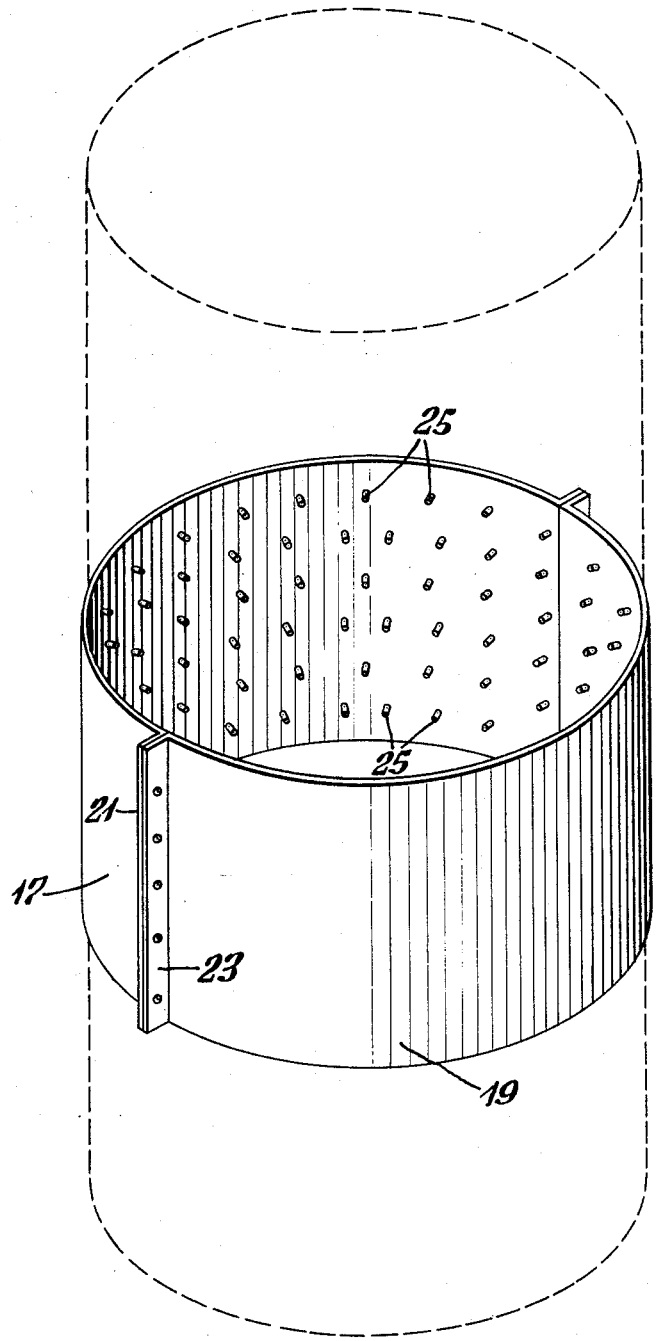
FIGURE 3 shows a clamp for engaging the electrode column and stub which can be used in those instances when a satisfactory close fitting contact between the electrode column and stub cannot be achieved.

As shown in FIGURE 3, each section of the clamp is provided with drilled flanges 21 and 23 through which bolts may be fastened to secure the clamps about the joint (not shown). The inner surface of each clamp section is provided with stubs 25 for the purpose of penetrating the electrode to thereby ensure good electrical contact and mechanical strengthening of the joint by reducing the possibility of relative movement between the electrode column and the stub.

The following examples are provided to more clearly illustrate the present invention:

*Example I*

A three-phase electric furnace employing 42 inch diameter Söderberg electrodes was in operation for the manufacture of calcium carbide. A break occurred in one of the electrodes at between 6 and 14 inches below the contact plates at an angle of about 10 degrees from horizontal. The resulting stub, about 75 inches in length, settled several inches into the surrounding furnace charge and tilted slightly from vertical. The electrical power input to the furnace was discontinued when the break was detected.

The stub was returned to axial alignment with the electrode column which was then lowered into mating contact with the stub. In order to ensure improved conductivity across the break, a steel clamp of the type illustrated was arranged around the joint between the electrode column and stub. The clamp was made from ⅜ inch plate having studs located on about 3 inch centers. The length of the clamp was 20 inches.

After the clamp was in place, about ⅓ normal operating power was applied to the electrode. At about three-hour intervals the power was shut off for a few minutes to permit safe inspection of the joint. As the lower end of the stub was consumed and baking of the mix progressed, the electrode was lowered further into the furnace and the forcible contact between the stub and electrode column was maintained.

After the elapse of 40 hours, 70 inches of new electrode had been baked which was sufficient to permit normal furnace operation. Additionally, at the end of the same period the stub had been substantially consumed. The electrode power input was therefore gradually increased to the normal value at this time and full operation of the furnace was resumed.

*Example II*

In another furnace of the same type an electrode break occurred and essentially the same procedure was followed except that a clamp was not employed since an almost total close mating contact was achieved between the severed portions of the electrode. Full operation of the furnace was resumed within 40 hours.

It can be seen from the above description that the present invention constitutes a beneficial contribution to the art by providing a method for restoring an electric furnace to full operation in a relatively short period of time after the occurrence of breakage of a self-baking electrode in the furnace.

What is claimed is:

1. A method for minimizing the delay in normal operation of a self-baking electrode which results from a stub-forming break in the baked portion of the electrode, said method comprising bringing the opposite surfaces of the severed portions of the electrode into forcible contact; supplying between about ¼ and ⅓ normal operating power to the electrode and providing a continuous supply of unbaked electrode mix and progressively lowering the electrode until sufficient electrode mix material is baked to permit resumption of normal electrode operation.

2. A method in accordance with claim 1 wherein the stub of the electrode is caused to support a substantial portion of the electrode weight to thereby provide a forcible contact between the severed portions of the electrode.

3. A method in accordance with claim 1 wherein an electrically conductive path is provided between the peripheral surfaces of the severed portions of the electrode to reduce the generation of heat at the contacting electrode surfaces and thereby avoid disruption of the forcible contact therebetween.

4. A method in accordance with claim 1 wherein an electrically conductive path is provided between the peripheral surfaces of the severed portions of the electrode to reduce the generation of heat at the contacting electrode surfaces and thereby avoid disruption of the forcible contact therebetween, said electrically conductive path being in the form of a metal clamp engaging the severed portions of the electrode.

References Cited in the file of this patent
UNITED STATES PATENTS

| | | |
|---|---|---|
| 2,032,240 | Westhaver | Feb. 25, 1936 |
| 2,640,860 | Herres | June 2, 1953 |